United States Patent
Benton

(10) Patent No.: US 10,578,337 B2
(45) Date of Patent: Mar. 3, 2020

(54) HVAC ADAPTER CURB AND INSTALLATION METHOD

(71) Applicant: Jason Rickman Benton, Tallassee, AL (US)

(72) Inventor: Jason Rickman Benton, Tallassee, AL (US)

(*) Notice: Subject to any disclaimer, the term of this patent is extended or adjusted under 35 U.S.C. 154(b) by 0 days.

(21) Appl. No.: 16/132,605

(22) Filed: Sep. 17, 2018

(65) Prior Publication Data

US 2019/0316808 A1 Oct. 17, 2019

Related U.S. Application Data

(60) Provisional application No. 62/658,707, filed on Apr. 17, 2018.

(51) Int. Cl.
  *F24F 13/32* (2006.01)
  *H02G 3/08* (2006.01)
  *F24F 13/20* (2006.01)

(52) U.S. Cl.
  CPC .............. *F24F 13/32* (2013.01); *F24F 13/20* (2013.01); *H02G 3/083* (2013.01)

(58) Field of Classification Search
  CPC ...... F24F 13/32; F24F 13/20; F24F 2013/207; F24F 1/20; F24F 1/22; F24F 1/60; F24F 2221/16; H02G 3/08; H02G 3/081; H02G 3/083; H02G 3/086
  See application file for complete search history.

(56) References Cited

U.S. PATENT DOCUMENTS

| 4,887,399 A | * | 12/1989 | Berger | F24F 13/24 52/27 |
| 5,896,711 A | * | 4/1999 | McClure | E04D 13/0315 52/198 |
| 6,795,300 B1 | * | 9/2004 | Holley | H02B 1/50 174/1 |
| 7,065,928 B1 | * | 6/2006 | Lane | E04D 13/0315 52/200 |
| 8,640,477 B1 | * | 2/2014 | Merideth | F24F 13/32 62/259.1 |
| 2011/0073017 A1 | * | 3/2011 | Wilson, Jr. | F24F 1/60 108/42 |
| 2012/0048521 A1 | * | 3/2012 | Reifel | F24H 8/00 165/111 |
| 2013/0326992 A1 | * | 12/2013 | Takagi | E04D 13/1407 52/649.2 |

(Continued)

*Primary Examiner* — Christopher M Koehler
(74) *Attorney, Agent, or Firm* — Waller Lansden Dortch & Davis, LLP; Blake M. Bernard

(57) ABSTRACT

An adapter curb for supporting a new HVAC unit on an existing HVAC curb at a work site is disclosed. The adapter curb can include an adapter curb frame including an upper end sized to mate with the new HVAC unit, a lower end sized to mate with the existing HVAC curb, and peripheral walls having an interior surface. One or more components can be pre-installed on the adapter curb frame, including but not limited to an electrical connection assembly, upper and lower sealing elements, interior insulation, one or more wind brackets, and/or a plurality of lifting flanges. The adapter curb with pre-installed features can help reduce installation time on site. A method of installing a new HVAC unit onto an existing HVAC curb with an adapter curb having pre-installed components is also disclosed.

9 Claims, 9 Drawing Sheets

(56) References Cited

U.S. PATENT DOCUMENTS

2015/0027066 A1\* 1/2015 Desmond ................ F24F 13/32
                                                                            52/27
2018/0251304 A1\* 9/2018 Stellabuto ................ B65G 7/04
2018/0269669 A1\* 9/2018 Kato ...................... H02G 3/081

\* cited by examiner

HVAC ADAPTER CURB AND INSTALLATION METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a non-provisional of U.S. Provisional Patent Application Ser. No. 62/658,707 filed Apr. 17, 2018 entitled HVAC ROOF ADAPTER CURB, which is hereby incorporated by reference in its entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to adapter curbs for HVAC systems.

More particularly, the present disclosure relates to roof adapter curbs used to facilitate connection of a new heating, ventilation, and air conditioning (HVAC) unit to the footprint of an old HVAC unit on a rooftop of a building. When roof top units reach the end of their useful life, they must be replaced with new units. Since 12-15 years have elapsed since the old unit was manufactured, improvements have been made in HVAC unit design to improve efficiency, reduce cost, etc. Many times, these changes result in different interface requirements (footprints) to the curb, even if the old and the new units are manufactured by the same manufacturer. In some instances, they can be very different interface configurations. In these cases, the industry norm is to fabricate an "adapter curb" to match the existing unit/curb on the bottom and match the new unit/curb on the top. The frames for these adapter curbs are factory fabricated to the given specifications of a particular project and shipped to the job site. Most often, these curbs are shipped with loose items that are needed for installation but items that are required to be field installed in current designs.

In many installations, electrical connections and wiring for the old unit are often not readily connectable to the electrical connections and wiring of the new unit. In the best case, the new connection is directly above the old connection but the electrical services still must be extended upward to accommodate the height of the adaptor curb. In the worst case, the connections are diagonally opposite from each other and services must be extended internally or in some situations externally around the adaptor curb. Thus, the technicians must rout electrical, controls, fire, communication, etc. cables from the existing point of contact to a new connection location which can involve field installing junction boxes, drilling holes for conduit connectors, field fabricating conduit components, cutting to length and installing new cables, splicing cable connections to the old, etc. Most times this effort requires some of the work to be done below the roof once the adapter curb is positioned on the existing curb. Such work can require the use of ladders and/or lifts, and can be cumbersome for the field technician, thereby adding significant time and cost to the installation of the new unit. Experience has shown that up to 50% of the crew's time is spent field fabricating and extending service cables alone. In addition, this work requires significant raw inventory be carried to the job in case such materials are needed for connecting the old electrical wiring to the new.

Additionally, in some installations, gas piping must be run to the new HVAC unit during installation. Like electrical wiring, connection of gas piping to the new HVAC unit can require a field technicians to spend time beneath the roof to run the existing piping up through the adapter curb and to the new HVAC unit, and can also include installing extension gas piping to connect to appropriate locations on the new HVAC unit.

Additionally, in many installations, sealing materials, such as top and bottom seals between the adapter curb and the new unit and existing curb, respectively, are installed on-site, as well as insulation materials on the interior walls of the adapter curb. This is a laborious and time consuming task. Once the old unit has been removed from the original curb, the installation crew cleans the mating surface and installs a new seal on the curb before installing the adapter curb on top of the original curb. This is typically accomplished with rolls of adhesive backed foam (neoprene) or similar material. If the weather is damp or wet, it is difficult to get the seal to stick and stay in position during the installation process, thereby leading to unwanted and expensive air leaks. This same problem occurs with the seal which is field applied to the top of the adapter curb. The sealing material can also produce significant waste materials, such as paper backings for the sealing materials, which can increase the clean-up of the installation site. Such materials can also be blown around or off of a roof or building site undesirably, creating more work for the installation crew in cleaning up the job site.

Once the adapter curb and new rooftop unit have been properly placed, code requires that the components be secured to the structure below in order to survive anticipated wind and seismic loading. Customarily, curb manufacturers provide "wind brackets" or "hurricane brackets" as lose items to be field installed on an upper end of the adapter curb to secure the new unit to the adapter curb. Further, curb manufacturers sometimes provide installation instructions for how the adapter curb is to be secured to the existing curb, typically by screwing the lower end of the adapter to the existing curb. Often this crucial part of the installation is left up to the discretion of the installation technicians (number of screws, spacing of screws, screw sizing, etc.) and may or may not be sufficient to handle the design loads.

The deficiencies in conventional adapter curbs discussed above can generally increase installation time and costs at a work site, which is undesirable. Additionally, adapter curbs and HVAC units often weigh hundreds of pounds and thus mechanical lifting is required via a crane or other lifting device during installation. Longer installation times can increase the amount of time the lifting equipment needs to be used and/or rented which can also significantly increase costs of installation.

What is needed then are improvements to roof adapter curbs for HVAC systems.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is an improved adapter curb for installing a new HVAC unit on an existing HVAC curb. The adapter curb can include one or more various pre-installed features which can help facilitate field installation and help reduce the on-site installation time for the new HVAC unit.

In some embodiments, an adapter curb for supporting a new HVAC unit on an existing HVAC curb at a work site can include an adapter curb frame including an upper end sized to mate with the new HVAC unit, a lower end sized to mate with the existing HVAC curb, and peripheral walls having an interior surface. An electrical connection assembly can be installed adjacent the interior surface of the peripheral walls. An access panel can be defined in one of the peripheral walls and positioned over the electrical connection assembly. The access panel can be configured to selectively provide access to the electrical connection assembly from an exterior of the adapter curb frame. The electrical connection assembly can be configured to readily connect to both existing wiring extending from the existing curb and new wiring associated with the new HVAC unit. The access panel can also allow the electrical connections between the existing wiring and the new wiring to be made by a field technician via the electrical connection assembly from an exterior of the adapter curb via the access panel such that connections don't have to be made from within the building and/or below a rooftop of the building, which can be time consuming and cumbersome.

Another aspect of the present disclosure is a method of installing a new HVAC unit on an existing HVAC curb at a work site, the method comprising the steps of providing at a remote location from the work site an adapter curb having an adapter curb frame including peripheral walls having an interior surface, an upper end sized to mate with the new HVAC unit, and a lower end sized to mate with the existing curb; pre-installing at the remote location an electrical connection assembly adjacent the interior surface of the peripheral walls; and forming at the remote location an access panel on the peripheral walls of the adapter curb frame, the access panel selectively providing access to the electrical connection assembly from an exterior of the peripheral walls of the adapter curb frame. The adapter curb can be transported to the work site, the lower end of the adapter curb can be installed on the existing curb, and a new HVAC unit can be installed on the upper end of the existing curb. Existing electrical wiring can be connected to new electrical wiring on the new HVAC unit via the electrical connection assembly, and the method can include removing the access panel and connecting the existing wiring and the new wiring to the electrical connection assembly from an exterior of the adapter curb.

In some embodiments, upper and lower seal elements can be pre-installed on the upper and lower ends of the adapter curb respectively, and interior insulation can be pre-installed on the interior surface of the peripheral walls of the adapter curb. In some embodiments, wind brackets with predrilled wind bracket holes can be pre-installed on the upper end of the adapter curb. Holes can also be pre-drilled into a base flange of the adapter curb for connecting the base flange to an existing curb.

Numerous other objects, advantages and features of the present disclosure will be readily apparent to those of skill in the art upon a review of the following drawings and description of a preferred embodiment.

DETAILED DESCRIPTION

Figure 1:
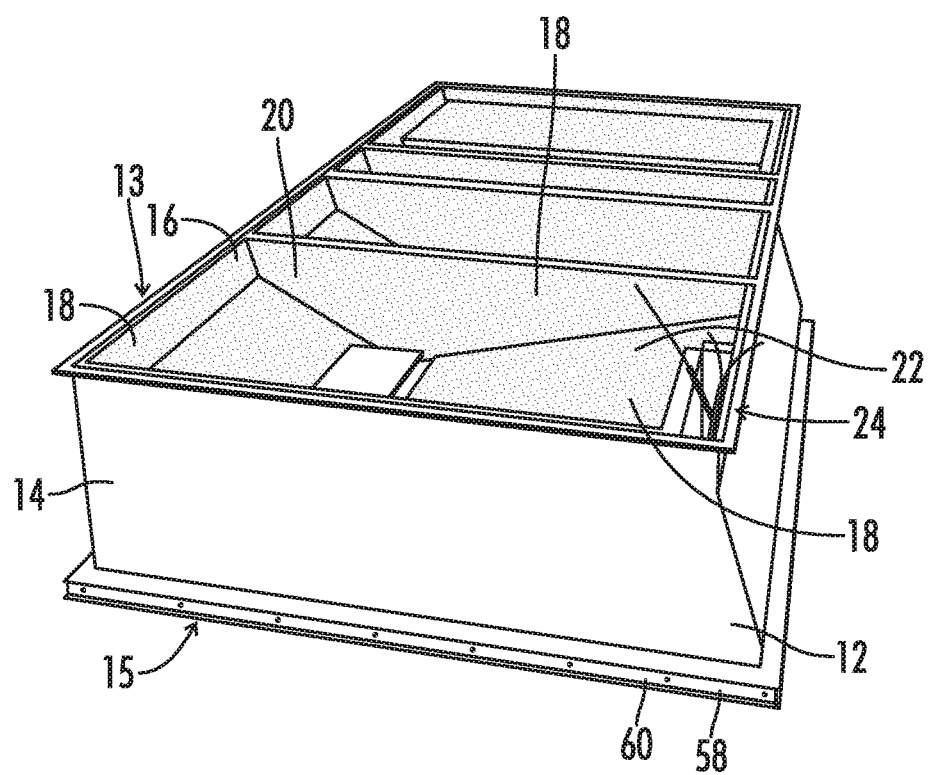
FIG. 1 is a prospective view of an embodiment of an adapter curb of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

An embodiment of an adapter curb 10 of the present disclosure is shown in FIGS. 1-7. The adapter curb 10 can include various features for the adapter curb 10 which are pre-installed or pre-assembled at a remote location, such as a factory or manufacturing facility, prior to transport of the adapter curb 10 to a work site, in order to help minimize the field labor and to help control the quality of the finished installation. The adapter curb 10 can also help eliminate the need to do any work below the roof or from within the building when replacing a roof top HVAC unit.

The adapter curb 10 can have an adapter curb frame 12 having an upper end 13, a lower end 15, and peripheral walls 14. The peripheral walls 14 can have an interior surface 16. In some embodiments, the adapter curb frame 12 can include one or more divider walls 20 spanning between opposing peripheral walls 14 of the adapter curb frame 12, as well as angled guide walls 22 designed to drive air from the new HVAC unit into an appropriate duct incorporated within the adapter curb 10, and/or to divide and separate supply air from return air. The lower end 15 and the upper end 13 of the adapter curb frame 12 can be of different sizes to accommodate as necessary the differing sizes between the existing curb on the job site and the new HVAC unit. One or more of the peripheral side walls 14 can be oriented at a non-perpendicular angle with respect to a plane of the upper and lower ends 13 and 15 of the adapter curb frame 12 to produce the varying sizes of the upper and lower ends 13 and 15 of the adapter curb frame 12.

In some embodiments, interior insulation 18 can be pre-installed on at least a majority of the interior surfaces 16 of the peripheral walls 14 of the adapter curb frame 12. In other embodiments, interior insulation 18 can be preinstalled on all interior surfaces 16 of the peripheral walls 14, the divider walls 20, and the angled guide walls 22. Interior insulation 18 can help increase the efficiency of the new HVAC unit by helping prevent thermal dissipation between the air from the HVAC unit and the adapter curb 10 or the ambient air, and to help reduce condensation from forming on the adapter curb 10 as air from the new HVAC unit passes through the adapter curb 10.

In some embodiments, the adapter curb 10 can include an electrical connection assembly 24 pre-installed adjacent the interior surface 16 of one of the peripheral walls 14, as shown in FIGS. 2-5. The electrical connection assembly 24 can include one or more components, including an electrical junction box 26, conduit 28, conduit fittings 31, extension wiring 30, wiring connectors 32, junction box access doors 34, and/or any other necessary components to connect the new HVAC unit wiring for electrical services to the existing wiring extending from the existing curb, the existing wiring tied into the electrical system or power grid of the building or work site. In some embodiments, the electrical connection assembly 24 can include a junction box support frame 36 which can be mounted to one or more of the peripheral walls 14 of the adapter curb frame 12, the junction box 26 and/or other components of the electrical connection assembly 24 mounted to the junction box support frame 36. The junction box support frame 36 can form an electrical compartment 38 between the junction box support frame 36 and the peripheral walls 14 of the adapter curb frame 12 in which the electrical connection assembly 24 is located. In some embodiments, the junction box support frame 36 can be mounted between adjacent peripheral walls 14 such that the electrical compartment 38 is formed in a corner of the adapter curb frame 12.

In some embodiments, the junction box 26 can have a first electrical connection port 42 oriented towards the upper end 13 of the adapter curb frame 12 and a second electrical connection port 44 oriented towards the lower end 15 of the adapter curb frame 12. Extension wiring 30 can be run from the junction box 26 to either the new HVAC unit or the existing wiring extending from the existing curb. Such extension wiring 30 can pass into the junction box 26 through the first electrical connection port 42 or the second electrical port 44 and the existing wiring or the new wiring can be passed through the other electrical connection port in the junction box 26 as appropriate, the extension wiring 30 being connected to either the old or new wiring within the junction box 26. In other embodiments, one or more of the electrical connection ports 42 and 44 can be located on a lateral side of the junction box 26, for instance when the wiring for a new HVAC unit is located diagonally across from the existing wiring extending from the existing curb, such that extension wiring 30 can be run laterally, diagonally, or around a perimeter of the adapter curb frame 12 from the junction box 26.

The exact structure and orientation of the electrical components of the electrical connection assembly 24, as well as the position of the electrical connection assembly 24 on the adapter curb frame 12, can be customized on each adapter curb frame 12 to accommodate the wiring configurations of the new and old wiring configurations of the new HVAC unit and the existing HVAC unit respectively. In some embodiments, the junction box 26 can generally be positioned on the adapter curb frame 12 such that the junction box 26 is positioned over the existing wiring extending from the existing curb when the adapter curb 10 is installed on the existing curb, with extension wiring 30 connected to the new wiring of the new HVAC unit. In other embodiments, the junction box 26 can be positioned on the adapter curb frame 12 to be positioned below the new wiring of the HVAC unit when the adapter curb 10 is installed on the existing curb, with extension wiring 30 connected to the existing wiring extending from the existing curb.

Figure 2:
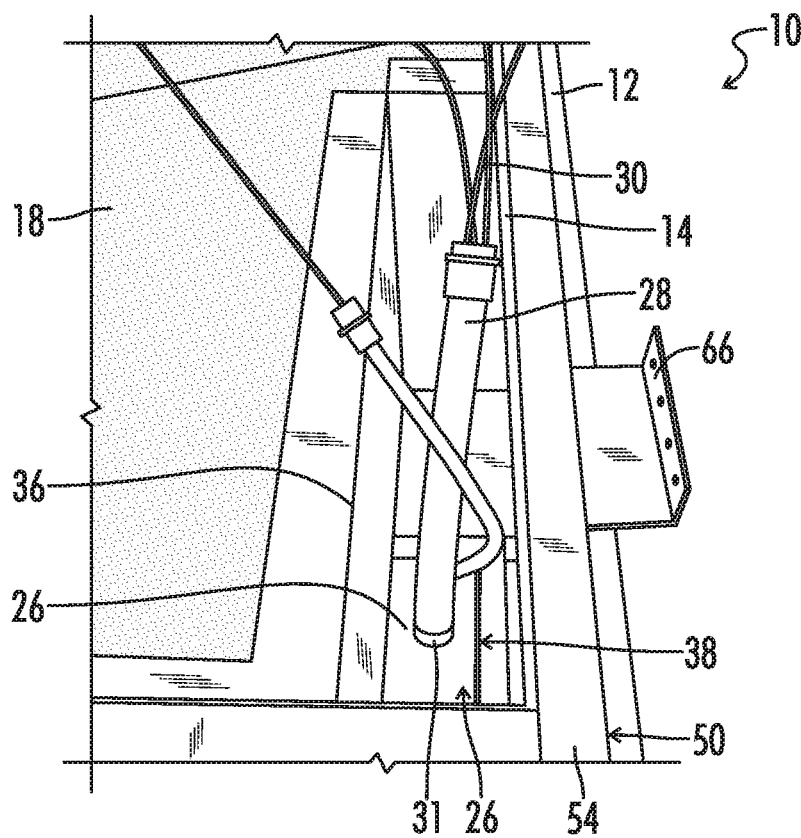
FIG. 2 is a top perspective view of an electrical connection assembly of the adapter curb of FIG. 1.
Figure 5:
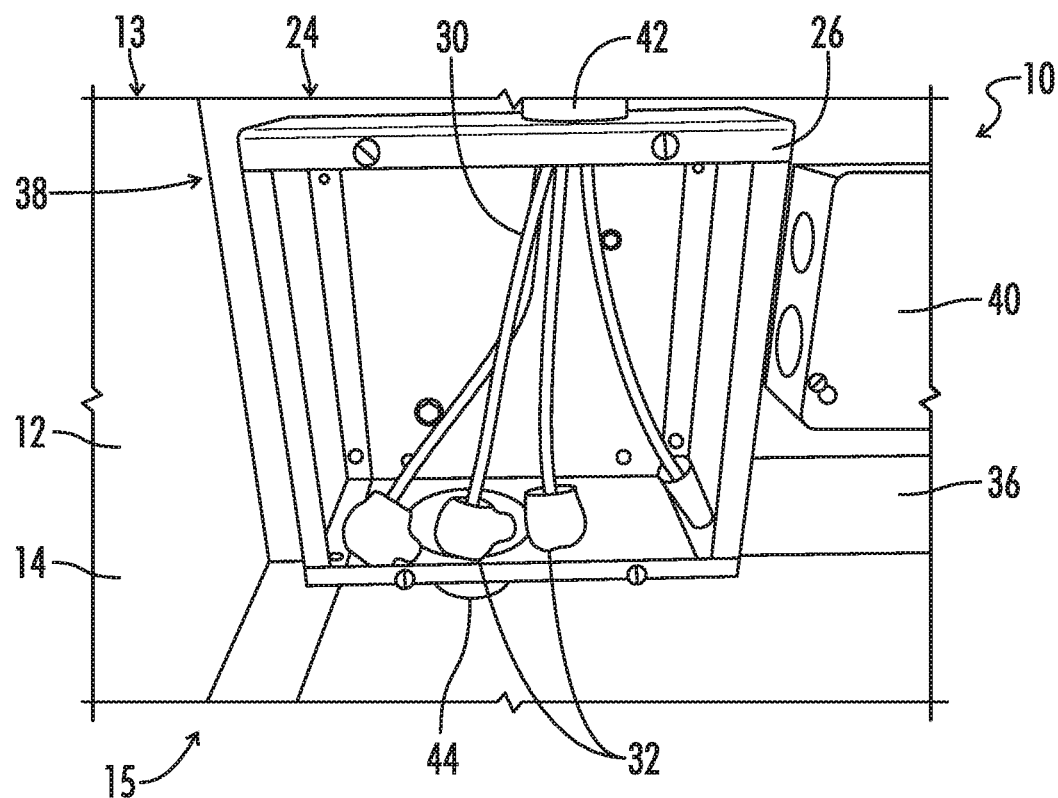
FIG. 5 is a detailed view of the internal components of the electrical connection assembly of FIG. 4.
Figure 6:
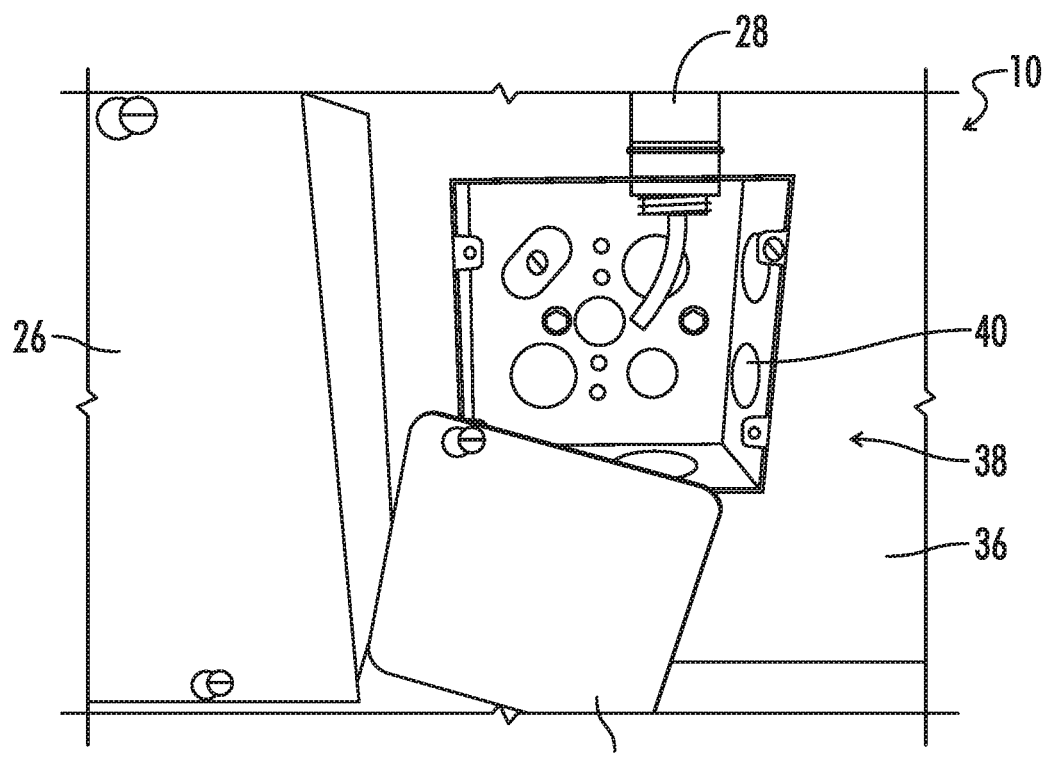
FIG. 6 is a detailed view of a controls junction box of the electrical connection assembly of FIG. 4.

Having the electrical connection assembly 24 pre-installed on the adapter curb 10 at a remote location from the work site can help minimize field installation of the electrical connections between the new and old wiring on site. FIGS. 2-5 illustrate such electrical connection features for the adapter curb 10. FIG. 2 shows the electrical compartment 38 and the cables or extension wiring 30 which can be connected to the new HVAC unit. The extension wiring 30 can extend through electrical conduits 28 which are fed to the junction box 26 through either the first electrical connection port 42 or second electrical connection port 44 in the junction box 26. FIG. 4 shows the internal junction boxes 24 and control junction boxes 40 for connecting the existing electrical wiring to the extension wiring for connecting to the new HVAC unit. FIG. 5 shows the extension wiring 30 ends within the junction box 26 with provided connectors 32 to connect to the existing wiring or new wiring as appropriate. Once the adapter curb 10 is installed on an existing curb at a work site, field technicians can simply rout the existing wiring into the junction box 26 and connect the existing wiring to the extension wiring 30, and then connect the extension wiring 30 to a terminal or circuit breaker on the new HVAC unit once the new HVAC unit is installed on the adapter curb 10. FIG. 6 shows the control and communication junction box 40 and a pull string. Again, the technician can bring the existing control wiring into the control junction box 40 and then extend the control wiring either directly or through extension wiring through the provided conduit 28 and up to the new HVAC unit.

Figure 3:
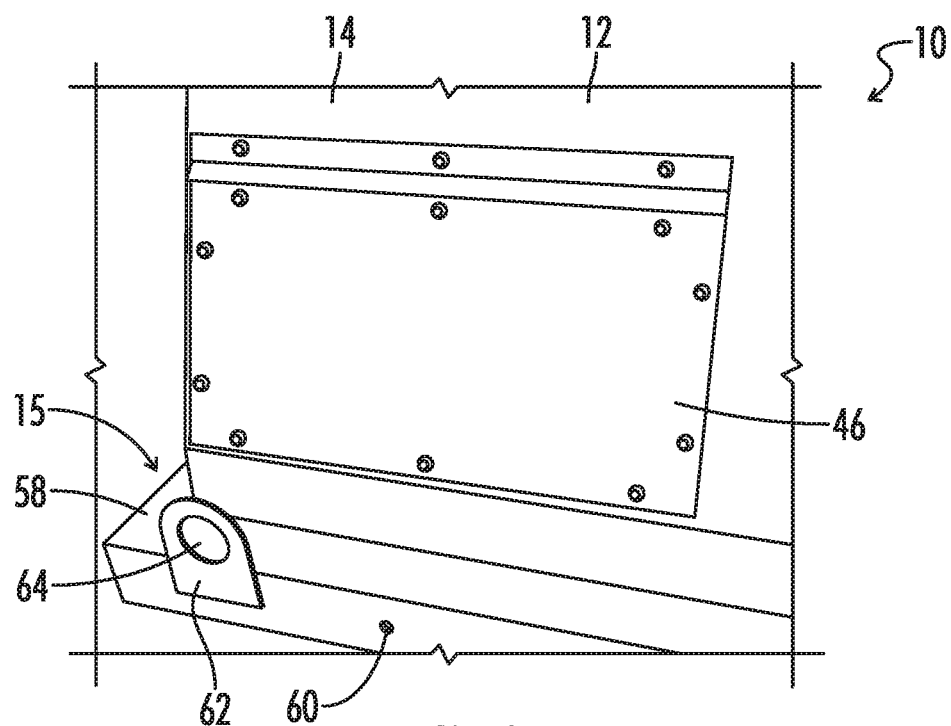
FIG. 3 is a perspective detailed view of an access panel on the adapter curb of FIG. 1.
Figure 4:
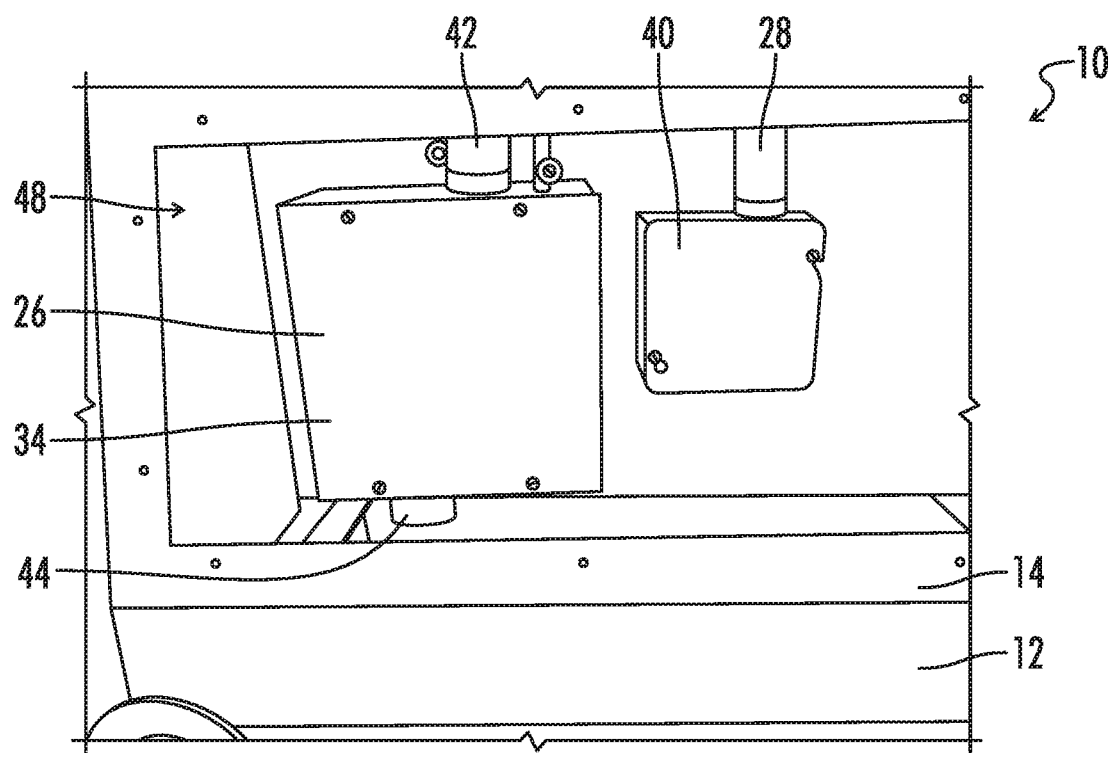
FIG. 4 is a perspective detailed view of the adapter curb of FIG. 1 with the access panel removed providing access to the electrical connection assembly within the adapter curb.

In some embodiments, as shown in FIGS. 3 and 4, an access panel 46 can be formed in one of the peripheral walls 14 of the adapter curb frame 12. The access panel 46 can be configured to selectively provide access to the electrical connection assembly 24 and/or the junction box 26 from an exterior of the adapter curb frame 12. One of the peripheral walls 14 can include an access opening 48 positioned adjacent the electrical connection assembly 24. The access panel 46 can be selectively securable over the access opening 48 in one of the peripheral walls 14 of the adapter curb frame 12 to provide access to the electrical connection assembly 24 through the access opening 48. The access panel 46 can thus selectively cover the electrical connection assembly 24. In some embodiments, the access opening 48 can be positioned adjacent the junction box 26 of the electrical connection assembly 24. As such, when the access panel 46 is removed from the peripheral walls 14 of the adapter curb frame 12, the junction box 24 can be accessible from an exterior of the adapter curb 10 via the access opening 48. A field technician can make the necessary connections between the existing wiring extending from the existing curb and any necessary extension wiring 30 extending from the junction box up to the new HVAC unit via the electrical connection assembly 24 and through the access opening 48 in the peripheral walls 14 of the adapter curb frame 12.

In addition to electrical wiring, in some embodiments, gas piping may need to be connected and/or extended to connect to a new HVAC unit. The connection of gas piping to the new HVAC unit can also be accomplished through the access opening 48 once the access panel 48 is removed, reducing the need for the technician to make gas piping connections from below the roof. In some embodiments, gas piping junctions can be preinstalled on the adapter curb 10 adjacent the access opening 48 to facilitate connection of existing gas piping to extension gas piping to be run to the new HVAC unit.

The access panel 46 is shown as being securable to the peripheral walls around a periphery of the access panel 46 via a plurality of screws or bolts. In other embodiments, the access panel 46 can be pivotally connected to one of the peripheral walls 14 of the adapter curb frame 12 along one edge of the access panel 46, the access panel 46 movable between an open and closed position over the access opening 48. In such an embodiment, the access panel 46 can be retained in a closed position over the access opening 48 by a lock, clasp, catch or other fastener positioned on the peripheral wall 14 of the adapter curb frame 12 opposite the edge of the access panel 46 pivotally connected to the peripheral wall 14. In some embodiments, the access panel 46 can include an access panel sealing element positioned on an interior side of the access panel 46 to form an airtight and/or watertight seal between the access panel 46 and the peripheral walls 14 of the adapter curb frame 12. In still other embodiments, interior insulation can be positioned on an interior side of the access panel 46.

While the adapter curb 10 shown in FIGS. 2-6 shows all electrical components internal to the adapter curb 10, for some situations, external electrical components may be utilized. All hardware and installation methods can comply with the National Electrical Code. All components can be UL listed. When conduit 30 and associated fittings are required to pass thru air spaces, such can be plenum rated. When exterior conduit and conduit fittings are required, such can be liquid tight and exterior rated. Power wiring and related components can be pre-sized for units requiring amperage. Pull strings can be provided for all control, energy management, and fire related cabling. All access doors can be of NEMA 3R type, rain-tight. The adapter curb of the present disclosure can help reduce field fabrication or installation labor associated with making the necessary electrical connections between the new and old wiring, can help reduce the need to carry a host of raw electrical components to the job site for field fabrication purposes, and can help reduce the need to work below the roof to make the necessary electrical connections to the existing wiring. Note that in most applications, working below the roof requires such equipment as a scissor lift and often requires that retail displays, stock materials, equipment, etc. be temporarily moved to allow access to the location, which can be inconvenient and time consuming. The adapter curb 10 of the present disclosure can also improve the overall quality of the installation by pre-installing as much hardware in a factory and/or controlled environment as possible.

Figure 8:
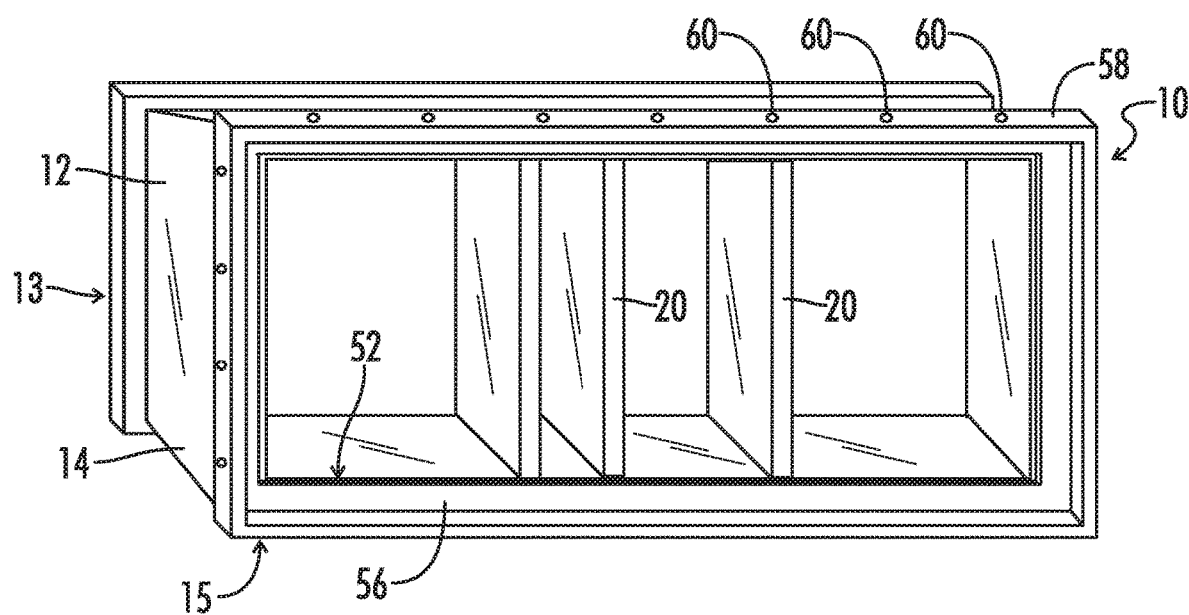
FIG. 8 is a bottom perspective view of an embodiment of an adapter curb of the present disclosure.

Referring now to FIGS. 2 and 8, in some embodiments, the upper end 13 of the adapter curb frame 12 can have an upper peripheral surface 50 configured to mate with a new HVAC unit and the lower end 15 of the adapter curb frame 12 can have a lower peripheral surface 52 configured to mate with an existing HVAC curb. The upper and lower peripheral surfaces 50 and 52 can be substantially horizontal surfaces when the adapter curb 10 is in an upright position and can extend around a perimeter or a periphery of the adapter curb frame 12 on the respective ends 13 and 15 of the adapter curb frame 12. Upper and lower sealing elements 54 and 56 can be pre-installed on the upper and lower peripheral surfaces 50 and 52, respectively, of the adapter curb frame 12 at a factory prior to shipping the adapter curb 10 to the work site. The lower sealing elements 56 can effectively form a seal between the adapter curb 10 and the existing curb when the adapter curb 10 is installed on the existing curb, and the upper sealing element 54 can effectively form a seal between the adapter curb 10 and the new HVAC unit when the new HVAC unit is installed on the adapter curb 10. In some embodiments, the upper and lower sealing elements 54 and 56 can also extend over upper and lower ends of the divider walls 20 to form seals between the divider walls of the adapter curb 10, the existing curb, and the new HVAC unit to help prevent mixing of the supply air and return air passing through the adapter curb 10. The upper and lower sealing elements 54 and 56 can be made from any suitable material, such as neoprene, that can form an airtight and watertight seal when compressed between two objects. Having seals formed between the existing curb and the adapter curb 10 as well as between the adapter curb 10 and the new HVAC unit can help prevent any leakage of air produced by the new HVAC unit between the adapter curb and either the existing curb or the new HVAC unit, and can thus help increase the efficiency of the new HVAC unit. Upper and lower sealing elements 54 and 56 can extend annularly around the upper and lower peripheral surfaces 50 and 52 on the upper and lower ends 13 and 15 of the adapter curb frame 12 such that annular seals are formed around the upper and lower perimeters of the adapter curb frame 12 between the new HVAC unit and the existing curb respectively. Annular seals can help reduce leakage around the entire upper and lower perimeter of the adapter curb frame, once the new HVAC unit is installed on the adapter curb frame 12 and the existing curb.

Having upper and lower sealing elements 54 and 56 pre-installed on upper and lower peripheral surfaces 50 and 52 of the adapter curb frame 12 at a remote location prior to shipping the adapter curb 10 to the worksite can help remove the tedious requirement for installing such sealing elements 54 and 56 in the field under various weather conditions, such weather conditions potentially negatively affecting the integrity of the connection of the seals to the adapter curb frame 12 and thus the quality of the seals formed between the adapter curb 10, the existing curb, and the new HVAC unit. Pre-installing the sealing elements 54 and 56 in a factory setting thus can help reduce air leakage and reduce operational energy cost for the new HVAC unit. Further, since the adhesive backed rolls of foam material used for the sealing elements 54 and 56 can have a paper divider to keep the foam from sticking to itself which must be removed prior to installation, pre-installing the sealing elements 54 and 56 onto the adapter curb frame 12 can also help reduce excess trash or waste from being generated on the rooftop at the work site that can easily be blown by the wind, which can make clean up after installation more cumbersome.

Referring now to FIGS. 1 and 8, in some embodiments the adapter curb frame 12 can include a lower base flange 58 extending vertically downward from the lower end 15 of the adapter curb frame 12. When the adapter curb 10 is installed on an existing curb 10, the lower base flange 58 can be oriented to overlap a side of the existing curb. The lower base flange 58 can include a plurality of pre-drilled or preformed base flange holes 60 defined in the lower base flange 58 at predetermined locations. A screw or other fastener can be inserted through each base flange hole 60 and driven into the existing curb when the adapter curb 10 is installed on the existing curb to secure the adapter curb 10 to the existing curb. Field technicians can be instructed to install a screw or fastener into every base flange hole 60 defined in the lower base flange 58 during installation. These pre-drilled base flange holes 60 not only facilitate the installation of attaching screws into an existing curb but also help insure that a pre-determined desired or adequate number of screws are installed and at locations intended by the structural engineer designing the adapter curb 10. Configurations for the base flange holes 60 can vary for different designs when varying weight, size, wind, seismic conditions, and safety factors are accounted for by the structural engineer.

As shown in FIG. 3, in some embodiments, the adapter curb 10 can have lifting flanges 62 mounted or welded to the adapter curb frame 12. Each lifting flange 62 can include lifting holes 64 or eyelets to facilitate grabbing of the adapter curb 10 by a crane hook for lifting the adapter curb 10 during installation. In some embodiments, the lifting flanges 62 can be mounted to the lower end 15 of the adapter curb frame 12, as shown in FIG. 3. In other embodiments, the lifting flanges 62 can be mounted or welded to the upper end 13 of the adapter curb frame 12.

Figure 7:
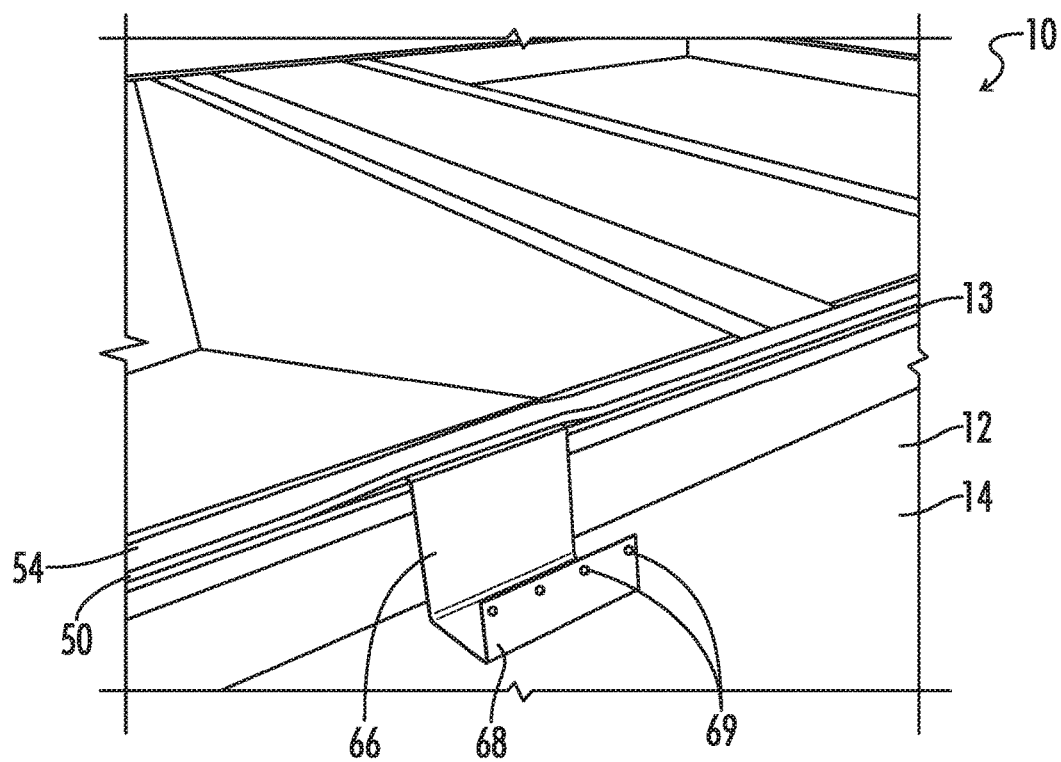
FIG. 7 is a detailed perspective view of an embodiment of a wind bracket of the adapter curb of FIG. 1.
Figure 13:
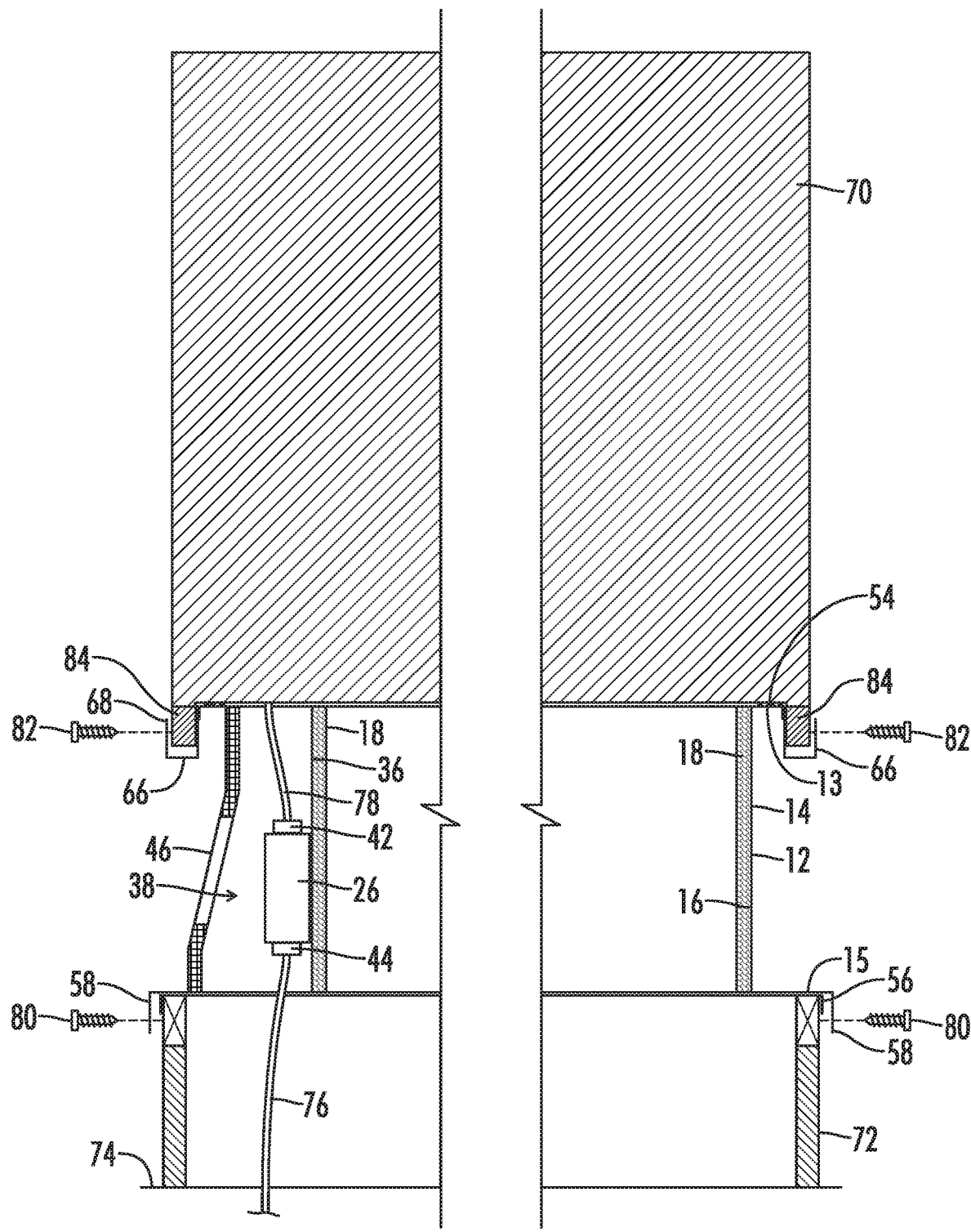
FIG. 13 is a cross-sectional view of another embodiment of a new HVAC unit and adapter curb being installed on an existing curb.

Referring now to FIG. 7, in some embodiments the adapter curb 10 can include one or more pre-installed wind brackets 66 mounted or connected to the upper end 13 of the adapter curb frame 12 to facilitate securing or anchoring the new HVAC unit to the adapter curb 10. In some embodiments, as shown in FIG. 13, the wind bracket 66 can extend over an upper end 13 of the adapter curb 10 and be secured to an interior wall 16 of the adapter curb 10 to secure the wind bracket 66 to the adapter curb 10. The upper sealing member 54 can be positioned over the wind bracket 66 such that a seal can be formed between the wind bracket 66 and the new HVAC unit once installed. Each wind bracket 66 can include an upward extending flange 68 which can be positioned on an edge of the upper end 13 of the adapter curb frame 12 and laterally outward from the upper end 13 of the adapter curb frame 12 in some embodiments. One or more wind bracket holes 69 can be defined through the upward extending flange 68 of each wind bracket 66. The upward extending flange 68 can be oriented to overlap with a portion of the new HVAC unit when the new HVAC unit is installed on the adapter curb frame 12 such that screws or other fasteners can be inserted through the wind bracket holes 69 and can be driven into the new HVAC unit to secure the new HVAC unit to the adapter curb 10.

As such, field technicians only have to install screws through each predrilled wind bracket hole 69 once the new HVAC unit is installed onto the adapter curb 10. In some embodiments, the one or more pre-installed wind brackets 66 can be secured to a side wall or side panel of the new HVAC unit. In other embodiments, the new HVAC unit can include a base rail extending below the HVAC unit. In such embodiments, the one or more wind brackets 66 can be a substantially U-shaped or C-shaped bracket which can receive the base rail of the new HVAC unit when the new HVAC unit is installed on the adapter curb 10, and the upward extending flange 68 of the wind brackets 66 can be secured to the base rail of the new HVAC unit. As with the pre-drilled base flange holes, field technicians can be instructed to install a screw into each pre-drilled wind bracket hole 69. As such, pre-installed wind brackets 66 with pre-drilled wind bracket holes 69 can help reduce install time but also help insure that units are secured properly as required by the structural engineer designing the adapter curb 10. The position and number of wind bracket holes 69 in each wind bracket 66 can be predetermined by the structural engineer and the wind brackets 66 can be pre-installed off site. The pre-installation of the wind brackets 66 on the adapter curb frame 12 prior to shipment of the adapter curb 10 to the worksite can help remove the chance of field technicians improperly installing the wind brackets 66 on site and thus can help ensure proper securement of the new HVAC unit to the adapter curb 10. The wind bracket design (quantity required, width, gauge, screw holes, etc.) for each adapter curb 10 can vary depending upon the wind/seismic conditions of the job site and the size of the new HVAC unit.

Figure 14:
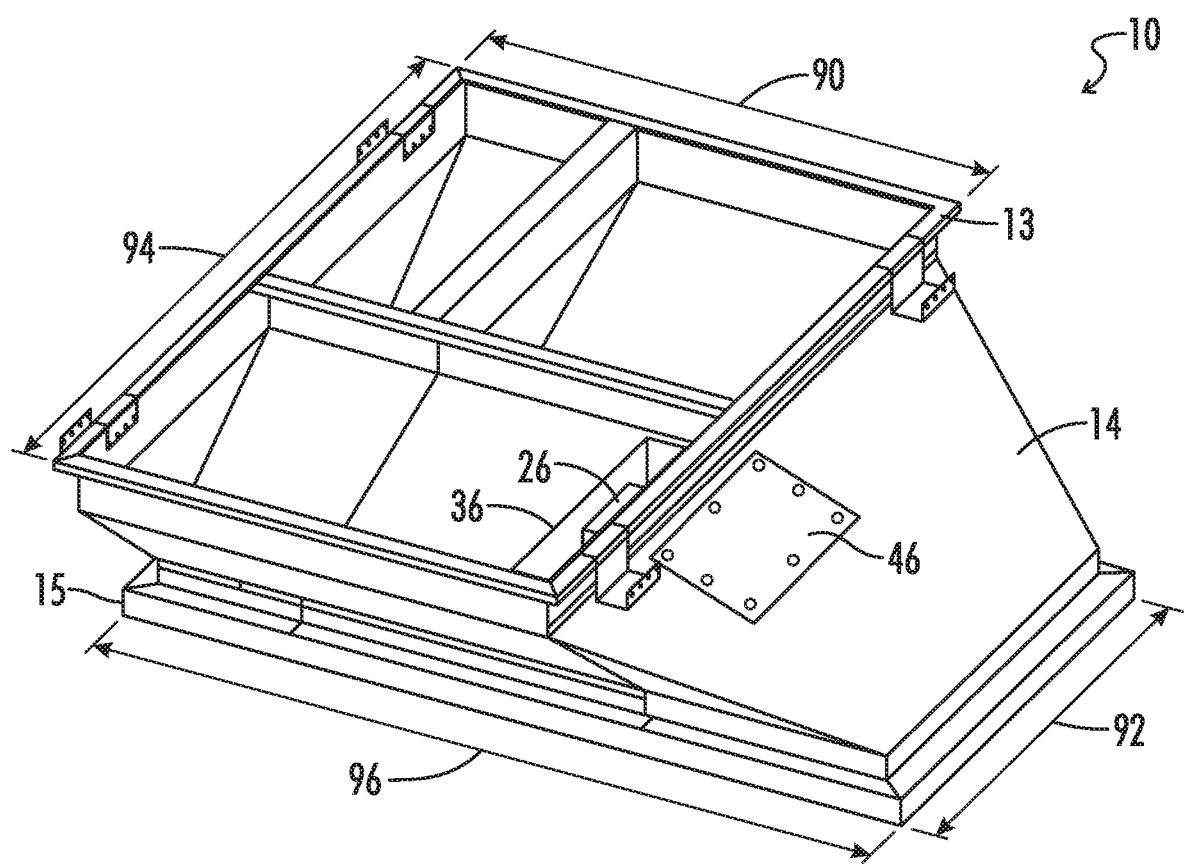
FIG. 14 is a side perspective view of another embodiment of an adapter curb wherein the upper end of the adapter curb is oriented substantially perpendicularly to the lower end of the adapter curb.

In some embodiments, as shown in FIG. 14, it may be necessary to orient the footprint of the new HVAC unit at a substantially perpendicular or 90 degree angle with respect to the footprint of the existing curb, such that a width 90 of the upper end 13 of the adapter curb 10 is oriented transverse to a width 92 of the lower end of the adapter curb 10, and a length 94 of the upper end 13 of the adapter curb 10 is oriented transverse to a length 96 of the lower end of the adapter curb 10. Side walls 14 of the adapter curb 10 can be angled significantly to accommodate such a difference in orientation between the footprint of the new HVAC unit and the existing curb. However, an access panel 46 can still be formed on a side wall 14 adjacent a junction box 26 for making electrical connections between the existing wiring and the new HVAC unit, the access panel 46 providing access to the junction box 26 when the access panel 46 is removed. Such adapter curbs can also include similar pre-installed upper and lower sealing elements, interior insulation, wind brackets, lifting flanges, and pre-drilled base flange holes as those discussed herein.

Figure 9:
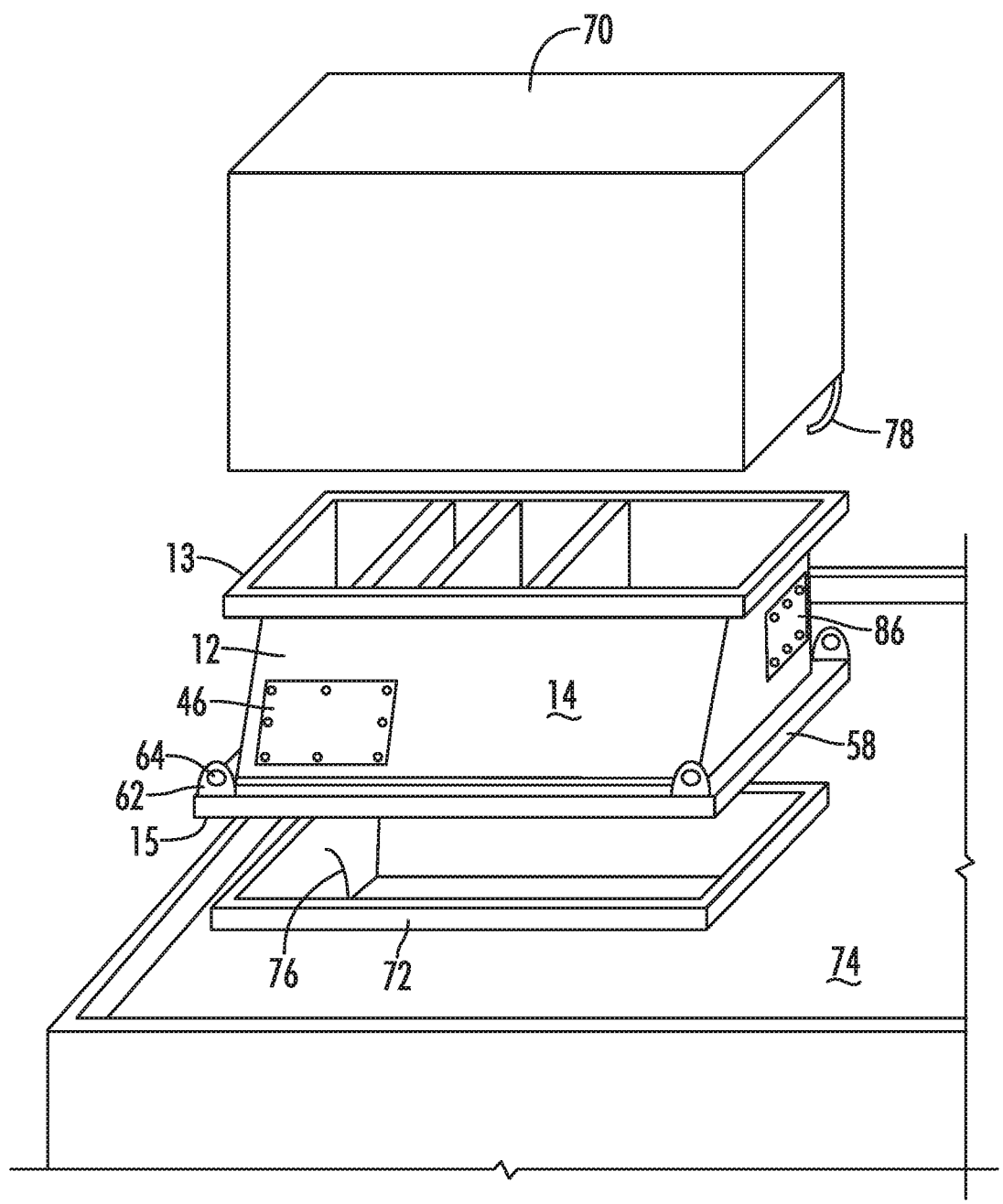
FIG. 9 is an exploded view of an embodiment of an adapter curb of the present invention being installed on an existing curb at a work site and new HVAC unit being installed on the adapter curb.

Referring now to FIGS. 1-4, 8, and 9-12, another aspect of the present disclosure is a method of installing a new HVAC unit 70 on an existing HVAC curb 72 at a work site 74. The method includes the steps of providing at a remote location from the work site 74 an adapter curb 10 having an adapter curb frame 12 including peripheral walls 14 having an interior surface 16, an upper end 13 sized to mate with the new HVAC unit 70, and a lower end 15 sized to mate with the existing curb 72. FIG. 9 shows the shapes and sizes of the upper and lower ends 13 and 15 of the adapter curb frame 12 matching or mating with the new HVAC unit 70 and the existing curb 72 respectively.

The method can include pre-installing at the remote location an electrical connection assembly 24 adjacent the interior surface of the peripheral walls 14, as shown in FIGS. 2-4, and forming at the remote location an access panel 46 on the peripheral walls 14 of the adapter curb frame 12, the access panel 46 selectively providing access to the electrical connection assembly 24 from an exterior of the peripheral walls 14 of the adapter curb frame 12.

Figure 10:
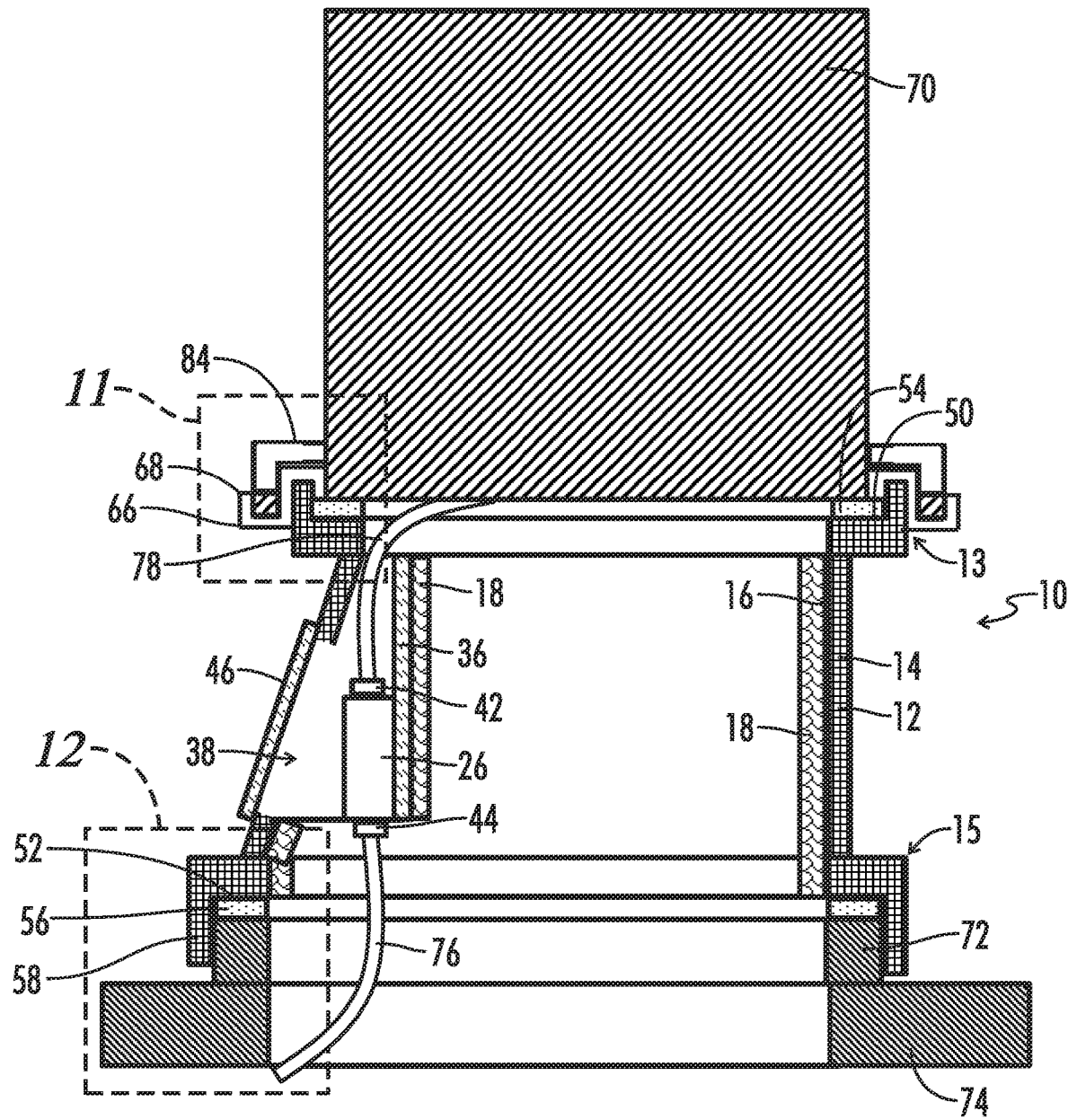
FIG. 10 is a cross-sectional view of an embodiment of a new HVAC unit and adapter curb being installed on an existing curb.
Figure 11:
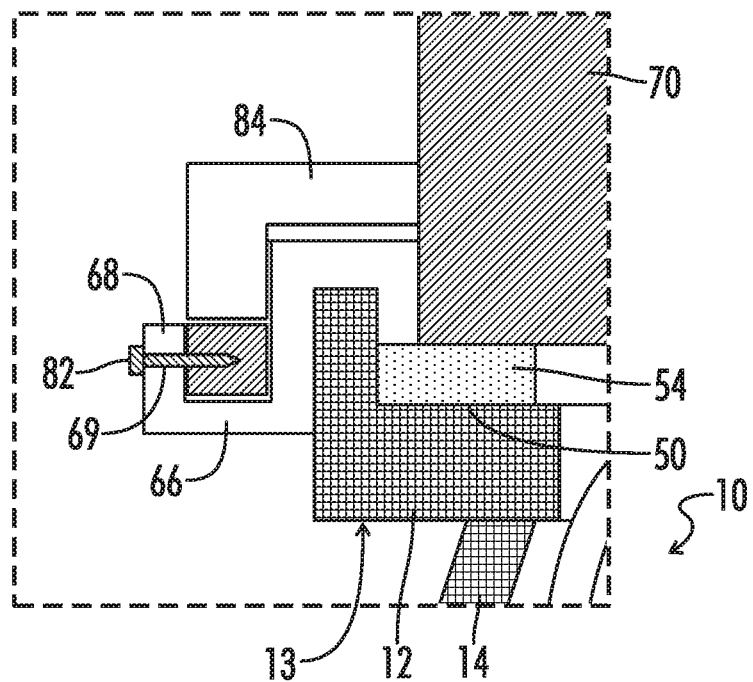
FIG. 11 is a detailed cross-sectional view of the engagement between a wind brackets and the new HVAC unit of FIG. 10.

The method can include transporting the adapter curb 10 to the work site 74, installing the lower end 15 of the adapter curb frame 12 on the existing curb 72, and installing the new HVAC unit 70 on the upper end 15 of the adapter curb frame 12, as shown in FIGS. 9-10. Once the adapter curb 10 is installed on the existing curb 72 and the new HVAC unit 70 is installed on the adapter curb 10, the pre-installed electrical connection assembly 24 can allow the electrical connections between existing wiring 76 extending from the existing curb 72 and extension wiring for connecting to the new HVAC unit 70 to be made quickly and conveniently via the pre-installed electrical connection assembly 24 which can help reduce field installation time associated with making such electrical connections. Additionally, in some embodiments including an access panel 46 on the peripheral walls 14 of the adapter curb frame 12, the method can include removing the access panel 46 from the peripheral walls 14 of the adapter curb frame 12 and electrically connecting the existing wiring 76 and the extension wiring 78 to the electrical connection assembly 24 from an exterior of the adapter curb frame 12.

In some embodiments, as shown in FIG. 9, the adapter curb frame 12 can include a first access panel 46 and a second access panel 86 defined on the peripheral walls 14 of the adapter curb frame 12. In some embodiments, the first access panel 46 can generally be positioned near the existing wiring 76 extending from the existing curb 72 when the adapter curb 10 is installed on the existing curb 72, and the second access panel 86 can be generally positioned near the new wiring 78 on the new HVAC unit 70 when then new HVAC unit 70 is installed on the adapter curb 10. The junction box of the electrical connection assembly can be positioned adjacent either access panel 46 or 86. As such, field technicians can remove both access panels 46 and 86 and connect the existing wiring 76 to the electrical connection assembly via the first access panel 46 and connect the new wiring 78 of the new HVAC unit 70 to the electrical connection assembly via the second access panel 86, both connections being made from an exterior of the adapter curb frame 12, which can help reduce the need to do any electrical installation from below the roof of the building or work site.

Referring again to FIGS. 1-4 and 8, in some embodiments, the method can include pre-installing at the remote location an upper seal element 54 on the upper end 13 of the adapter curb frame 12 and a lower seal element 56 on the lower end 15 of the adapter curb frame 16. The lower end 15 of the adapter curb frame 12 can be installed onto the existing curb 72 such that a lower seal is formed with the lower seal element 56 between the lower end 15 and the existing curb 72. The new HVAC unit 70 can be installed on the upper end 13 of the adapter curb frame 12 such that an upper seal is formed with the upper seal element 54 between the upper end 13 and the new HVAC unit 70, as shown in FIG. 10. In some embodiments, upper and lower sealing elements 54 and 56 can extend around peripheral edges of the upper and lower ends 13 and 15 of the adapter curb respective and/or on upper and lower surfaces of divider walls 20 of the adapter curb 10. Having the sealing elements pre-installed on the adapter curb frame 12 can help reduce installation time on site and also ensure that the sealing elements are properly secured to the adapter curb frame 12 such that proper seals are formed between the existing curb 72, the adapter curb 10, and the new HVAC unit 70. In some embodiments, the method can include pre-installing at the remote location interior insulation 18 on the interior surface 16 of the peripheral walls 14, which can further help reduce field installation time for the adapter curb 10 and the new HVAC unit 70.

Figure 12:
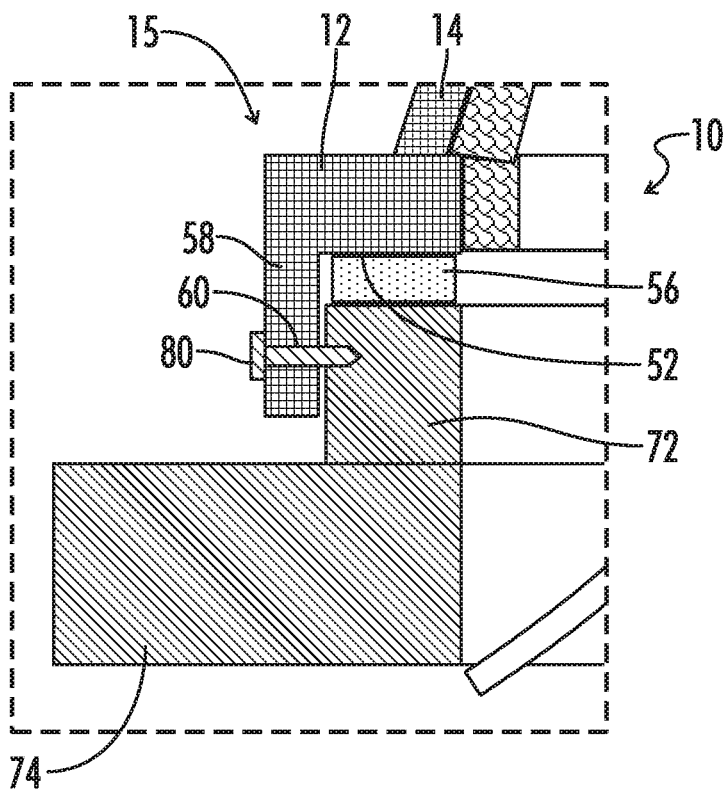
FIG. 12 is a detailed cross-sectional view of the engagement between a lower base flange of the adapter curb and the existing curb of FIG. 10.

In some embodiments, the lower end 15 of the adapter curb frame 12 can include a lower base flange 58 extending in a downward direction, the lower base flange 58 including a plurality of pre-drilled base flange holes 60. The method can further include installing the lower end of the adapter curb frame 12 onto the existing curb 72, and securing the lower end 15 of the adapter curb frame 12 to the existing curb 72 by driving a plurality of base fasteners 80 through corresponding pre-drilled base flange holes 60 and into the existing curb 72, as shown in FIG. 12.

In some embodiments, the adapter curb frame 12 can include a plurality of lifting connection flanges 62, each lifting connection flange 62 including a pre-drilled lifting hole 64, and the method can further include lifting the adapter curb 10 via the lifting connection flanges 62 to install the adapter curb 10 onto the existing curb 72.

In some embodiments, the method can further include pre-installing at the remote location at least one wind bracket 66 on the upper end 13 of the adapter curb frame 12, the at least one wind bracket 66 having predefined wind bracket holes 69. The lower end 15 of the adapter curb frame 12 can be installed onto the existing curb 72, and the new HVAC unit 70 can be installed onto the upper end 13 of adapter curb frame 12. The new HVAC unit 70 can be secured to the at least one wind bracket 66 by extending corresponding wind bracket fasteners 82 through the wind bracket holes 69 and into the new HVAC unit 70, as shown In FIG. 10. The new HVAC unit 70 is shown in FIG. 10 as having a lower base rail 84 which can be placed in the wind bracket 66, the wind bracket fasteners 82 driven into the base rail 84 of the new HVAC unit 70. As shown in FIG. 13, in some embodiments the new HVAC unit can be sized to extend past or stick out from the upper end 13 of the adapter curb 10 with the base rail 84 extending from a bottom surface of the new HVAC unit and into the wind bracket 66, the wind bracket 66 being secured to the base rail 84 via the wind bracket fasteners 82.

As can be seen from the present disclosure, pre-installing the various features discussed herein on an adapter curb prior to shipment of the adapter curb to the work site can help reduce field installation time for a new HVAC unit, which can help reduce the costs of such installations. Having certain features pre-installed offsite by or under the supervision of a structural engineer can also help ensure the integrity of one or more of the sealing elements on the adapter curb, or the fastening or securement configuration between the adapter curb and the existing curb and the adapter curb and the new HVAC unit.

Thus, although there have been described particular embodiments of the present invention of a new and useful HVAC Adapter Curb and Installation Method, it is not intended that such references be construed as limitations upon the scope of this invention.

What is claimed is:

1. An adapter curb for supporting a new HVAC unit on an existing HVAC curb at a work site, the adapter curb comprising:
   an adapter curb frame including an upper end sized to mate with the new HVAC unit, a lower end sized to mate with the existing HVAC curb, and peripheral walls having an interior surface, the peripheral walls extending between the upper and lower ends of the adapter curb;

an electrical connection assembly installed within the peripheral walls and adjacent the interior surface of the peripheral walls; and an access opening defined in one of the peripheral walls adjacent the electrical connection assembly; and an access panel selectively securable to the peripheral walls over the access opening, the access panel configured to selectively provide access to the electrical connection assembly through the access opening from an exterior of the adapter curb frame.

2. The apparatus of claim 1, wherein the electrical connection assembly includes a first electrical connection port oriented toward the upper end of the adapter curb frame and a second electrical connection port oriented toward the lower end of the adapter curb frame.

3. The apparatus of claim 1, further comprising:
an upper seal element positioned on the upper end of the adapter curb frame; and
a lower seal element positioned on the lower end of the adapter curb frame.

4. The apparatus of claim 3, wherein:
the upper seal element extends annularly around a perimeter of the upper end of the adapter curb frame; and
the lower seal element extends annularly around a perimeter of the lower end of the adapter curb frame.

5. The apparatus of claim 1, further comprising a plurality of wind brackets connected to the upper end of the adapter curb frame, each wind bracket including an upwardly extending flange positioned on an edge of the upper end of the adapter curb frame, each wind bracket having predefined wind bracket holes.

6. The apparatus of claim 1, further comprising a lower base flange extending downward from the lower end of the adapter curb frame, the lower base flange including a plurality of predrilled base flange holes.

7. The apparatus of claim 1, wherein the electrical connection assembly further comprises a junction box support frame mounted between two adjacent peripheral walls of the adapter curb frame, and a junction box mounted to the junction box support frame, the junction box aligned with the access opening.

8. The apparatus of claim 1, wherein the lower end and the upper end of the adapter curb frame have different sizes, and at least one of the peripheral walls is oriented at a non-perpendicular angle with the upper end and the lower end of the adapter curb frame.

9. The apparatus of claim 1, further comprising interior insulation covering at least a majority of the interior surface of the peripheral walls.

* * * * *